United States Patent [19]
Roubal

[11] 3,880,495
[45] Apr. 29, 1975

[54] STEREO VIEWING APPARATUS

[76] Inventor: Joseph J. Roubal, 5135 W. 22nd Pl., Cicero, Ill. 60650

[22] Filed: Dec. 16, 1970

[21] Appl. No.: 98,947

Related U.S. Application Data

[63] Continuation of Ser. No. 814,497, Mar. 17, 1969, abandoned, which is a continuation of Ser. No. 539,974, Apr. 4, 1966, abandoned.

[52] U.S. Cl. ............... 350/142; 350/143; 350/241
[51] Int. Cl. ........................................... G02b 27/22
[58] Field of Search.................... 350/133, 142, 143

[56] References Cited
UNITED STATES PATENTS

| 953,879 | 4/1910 | Williams | 350/187 X |
|---|---|---|---|
| 2,169,397 | 8/1939 | Stanley | 350/187 UX |
| 2,656,758 | 10/1953 | Cole | 350/142 |
| 2,694,339 | 11/1954 | Baireuther et al. | 350/142 |
| 2,787,191 | 4/1957 | Horton et al. | 350/143 X |

FOREIGN PATENTS OR APPLICATIONS

| 1,249,917 | 11/1960 | France | 350/142 |

Primary Examiner—Paul A. Sacher

[57] ABSTRACT

Stereo viewing apparatus arranged for focusing wherein the stereo viewing objectives are adjustable at a distance of an open space of peep openings of a frontal wall and therewith respect to the rear of the viewing apparatus whereat locates a stereo transparent photograph or comparable viewing matter.

1 Claim, 8 Drawing Figures

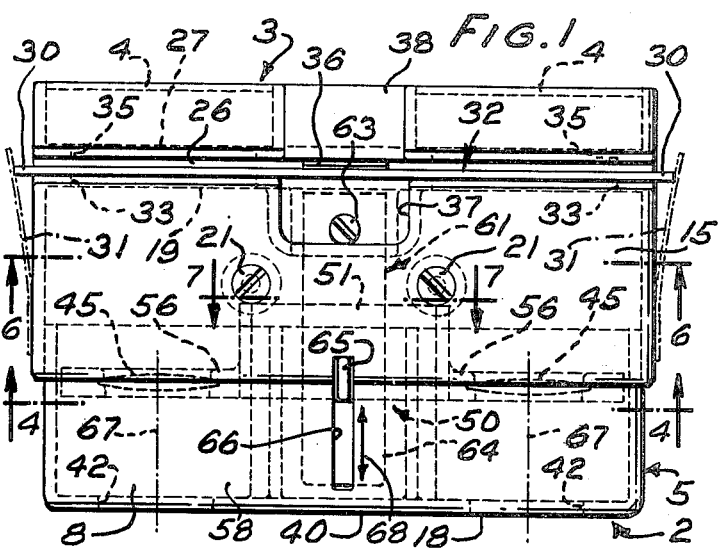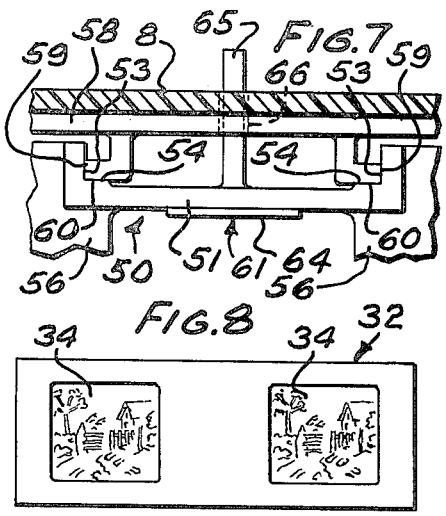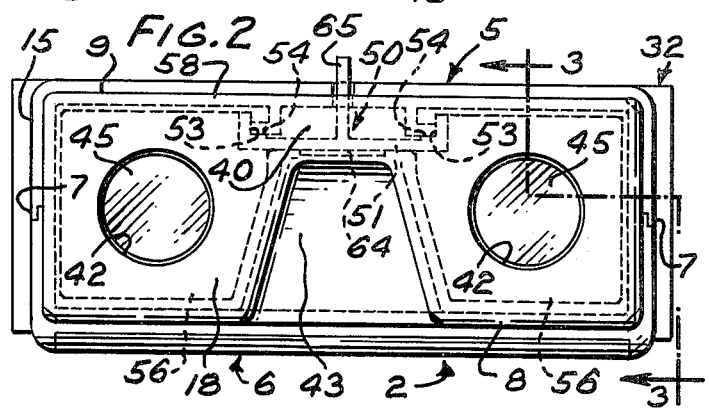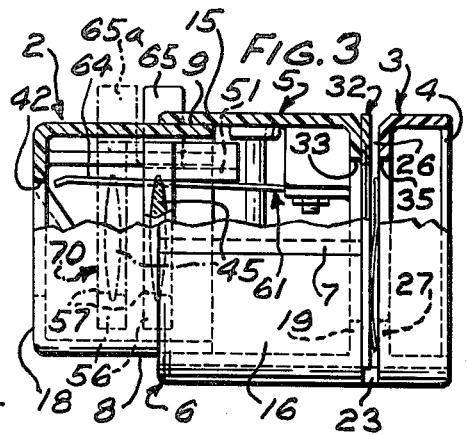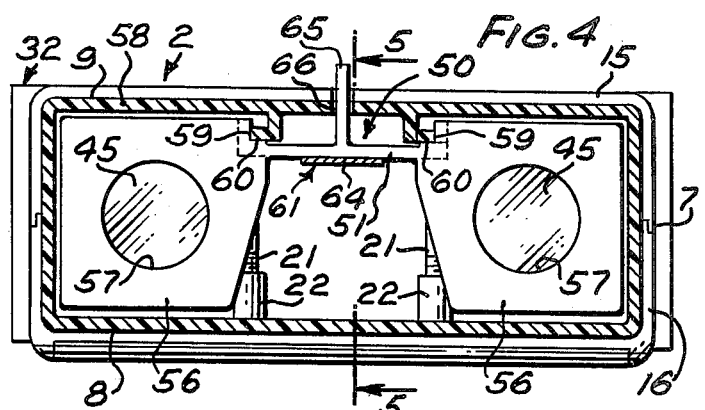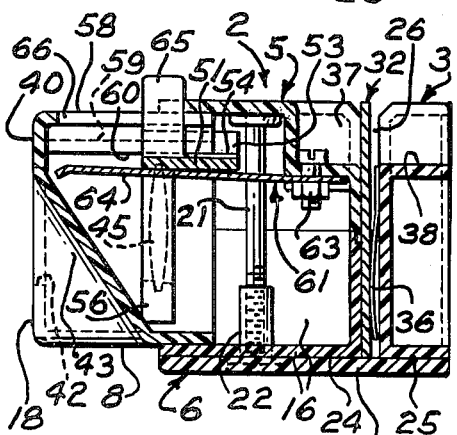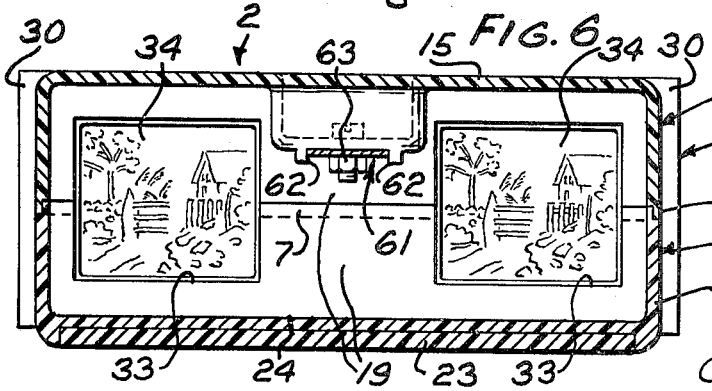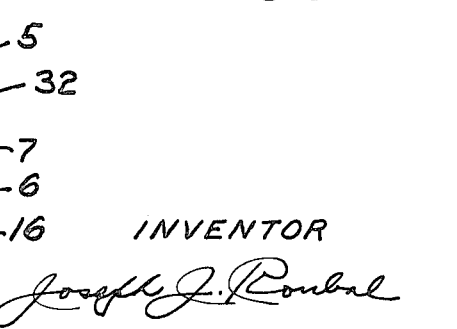

STEREO VIEWING APPARATUS

This invention relates to stereoscopes and more particularly to stereo viewing apparatus, and this application is a continuation of my co-pending application, Ser. No. 814,497, now abandoned filed Mar. 17, 1969 as a continuation of now abandoned application Ser. No. 539,974, filed Apr. 4, 1966.

Invariably a focusing arrangement in stereo viewing apparatus requires more complicated means to mount the stereo viewing objectives and also requires an involved and costly rack and pinion by means of which the mounted stereo viewing objectives are adjustable to focus.

It is the principal object of the invention to provide new and novel apparatus for stereo viewing and that permits a simple mounting of the stereo viewing objectives, and, that utilizes a simple slidably adjustable arrangement instead of a rack and pinion as is customarily employed in focusing.

The foregoing and other objects and advantages in view will become apparent from the reading of the accompanying specification in connection with the drawings, in which FIG. 1 is a top plan view of a stereo viewing box embodying the invention.

FIG. 2 is a front view thereof.

FIG. 3 is a section-elevation taken on line 3—3 of FIG. 2.

FIG. 4 is a section taken on line 4—4 of FIG. 1.

FIG. 5 is a section taken on line 5—5 of FIG. 4.

FIG. 6 is a section taken on line 6—6 of FIG. 1.

FIG. 7 is a section on a larger scale taken on line 7—7 of FIG. 1.

FIG. 8 shows an elevational view on a reduced scale of a stereo transparent photograph used in the present viewing box.

It is understood, in the present form as is shown in the drawings, the stereo viewing box 2 includes a light source rear box 3. The rear box 3 admits external light from light diffusing panels 4, 4. However light by electrical illumination (not shown) may be arranged to enter the rear box and such a modification is well known in the art.

It is desirable that the box 2 is openable, and to this end housing sections 5 and 6 separate at a tongue 7. In the construction, the housing section 5 is formed by a frontally closed housing 8 that is attached by cementing at 9 to a top half housing 15. The half housing 15 constitutes one tongue portion 7, and by means of the other tongue portion 7, a bottom half housing 16 of the section 6 forms the closure, as is shown.

In the arrangement, the housing 8 provides a frontal wall 18, and the half housings 15 and 16 provide a rear wall 19, as is shown in FIG. 6. Bolts 21 engaging in sockets 22 maintain the assembly of the box 2.

To include the rear box 3 in the assembly, a horizontal plate 23 is attached by cementing (FIG. 5) indicated 24 and 25, bottom wise of the half housing 16 and bottom wise of the rear box 3. A slot 26 is arranged between the rear wall 19 and a wall 27 of the rear box 3, and this admits a stereo transparent photograph 32 to locate at the rear wall 19.

As is shown in FIG. 6, in the rear wall 19 windows 33, 33 are arranged to coincide with stereo spaced transparent pictures 34, 34 that are carried by the photograph 32. Windows 35, 35 corresponding with the windows 33, 33, as is seen in FIG. 1, are arranged in the wall 27 of the rear box 3, and it will be seen that, light passing diffused at the panels 4, 4 will thereby illuminate the spaced pictures 34, 34. It is understood, the photograph 32 is replaceable at the slot 26 thus to have other stereo pictures. A spring 36 applied to the slot 26 will retain the photograph 32 locating at the rear wall 19, and depressions 37, 38 for the operator's fingers permit removal of the photograph. As is shown, the photograph may extend outwardly at ends 30, 30 and thereby it may be shifted by the operator's fingers to the right or the left to obtain extended in-focus viewing of the pictures 34, 34. Springs 31, 31 indicated in FIG. 1 may be arranged to position the photograph centrally.

It is understood, the viewing box 2 is held for viewing wherein the operator peers into peep openings 42, 42. The peep openings are formed in the frontal wall 18, as is shown. Also formed in the frontal wall is a bridge surface 40 that extends above a nose recess 43, and this adapts the box 2 for the viewing.

A magnification in the viewing of the pictures as locate at the windows 33, 33 is obtained by stereo viewing objectives 45, 45. In this magnification, a focusing adjustment to accomodate individual viewing is required, and, such is obtained wherein, as the operator peers into the peep openings 42, 42, the stereo viewing objectives 45, 45 permit to be manually slidably adjusted, as is seen in FIGS. 1, 3 and 5, at a suitable distance of an open space of the peep openings 42, 42, and in an arrangement, as will now be described.

For the purpose of this focusing, a sliding support 50 has a bridge plate 51 that at opposite ends provides, side slide bearings 53, 53 and top facing slide bearings 54, 54.

The bridge plate 51 also provides projections 56, 56. As is shown, the projections 56, 56 are spatially extending, and in apertures 57, 57 mount and carry the stereo viewing objectives 45, 45.

Depending members formed at the underside of a top wall 58 of the housing 8 (FIGS. 4, 5 and 7) provide side slide guide ways 59, 59 and bottom facing slide guide ways 60, 60.

An elongated leaf spring 61 between shoulders 62, 62 (FIG. 6) and secured in place by a blot 63 provides a resilient portion 64. The spring through the resilient portion 64 contacts the bridge plate 51 at its underside and thereby in the mounting, as is described, the sliding support 50 at the bridge plate 51 is springingly retained in the side slide bearings 53, 53 and top facing slide bearings 54, 54 at the side slide guide ways 59, 59 and bottom facing slide guide ways 60, 60.

In the above arrangement, when the sliding support 50 slides and moves, the stereo viewing objectives 45, 45 by the projections 56, 56 will move along the optical axis 67, 67 (FIG. 1). And further, it will be seen, these viewing objectives 45, 45 will move in the open space as exists, due to the separation of the walls 18 and 19, between the peep openings 42, 42 and the windows 33, 33 whereat locate the stereo pictures 34, 34.

For manual adjustment by which the operator will cause the focusing adjustment, a finger member 65 is carried centrally on the bridge plate 51. As is shown, the finger member projects through a slot 66 in the top wall of the housing 8 and this allows a back and forth movement of the support 50 and at opposite ends the slot limits the sliding.

It should be seen that by the action of the spring portion 64 contacting the underside of the plate 51 that also the viewing objectives are frictionally held in any adjusted viewing position.

It is understood, in operation, the viewing box 2 is held, as is described, wherein the operator's eyes peer into the peep openings 42, 42 and thereby, at the suitable distance of the open space, as mentioned, the operator's eyes further peer into the stereo viewing objectives 45, 45. And therewith, to adjust for individual viewing, the operator by the fingers of one hand slidably moves the finger member 65, back and forth, as is indicated by 68 in FIG. 1, and such will permit the focusing adjustment of the viewing objectives 45, 45 as to the pictures 34, 34 of the photograph 32 locating at the windows 33, 33. In FIG. 3, one focus adjusted position of the viewing objectives is shown by the dashed lines 70 and the finger member dashed lines 65a.

Modifications may be resorted to without departing from the spirit of the invention or the scope of the appended claim, which is not limited to the specific construction shown.

What is claimed is -

1. In stereo viewing apparatus, rear means for locating stereo information to be viewed, slidably adjustable means arranged mounting stereo viewing objectives for focus adjusting of the stereo viewing objectives in a back and forth movement, and frontal means arranged fixed and spaced with respect to said rear means and said frontal means having fixedly located peep openings that are arranged at a suitable distance of an open space with respect to said focus adjustable stereo viewing objectives and whereby when the operator peers into said peep openings he views at the suitable distance of the open space in said focus adjustable stereo viewing objectives the stereo information located by said rear means.

* * * * *